United States Patent [19]

Bathgate

[11] Patent Number: 5,051,206
[45] Date of Patent: Sep. 24, 1991

[54] BLOWING AGENT COMPOSITION

[75] Inventor: Raymond J. Bathgate, Royston, England

[73] Assignee: Schering Agrochemicals Ltd., United Kingdom

[21] Appl. No.: 262,185

[22] Filed: Oct. 20, 1988

Related U.S. Application Data

[63] Continuation of Ser. No. 39,798, Apr. 15, 1987, abandoned, which is a continuation of Ser. No. 626,093, Jun. 29, 1984, abandoned.

[30] Foreign Application Priority Data

Jun. 20, 1983 [GB] United Kingdom ............... 8317799

[51] Int. Cl.$^5$ ............................ C09K 3/00; C01G 9/00
[52] U.S. Cl. ............................. 252/350; 252/182.33; 423/365
[58] Field of Search ............................ 252/350, 182.33; 423/365

[56] References Cited

U.S. PATENT DOCUMENTS

| 2,360,049 | 10/1944 | Cuthbertson | 252/182 |
|---|---|---|---|
| 2,801,154 | 7/1957 | DePree et al. | 423/365 |
| 2,889,198 | 6/1959 | Barrett et al. | 423/365 |
| 3,116,107 | 12/1963 | Nelson | 423/365 |
| 3,167,387 | 1/1965 | Erner | 423/365 |
| 3,321,413 | 5/1967 | Riley et al. | 252/350 |
| 3,340,209 | 9/1967 | Riley et al. | 252/182 |
| 3,898,258 | 8/1975 | Van Helden et al. | 502/150 |
| 4,104,195 | 8/1978 | Ley et al. | 252/350 |
| 4,243,755 | 1/1981 | Marx et al. | 252/182 |
| 4,369,126 | 1/1983 | Bathgate | 252/350 |
| 4,394,288 | 7/1983 | Allada | 252/350 |
| 4,438,223 | 3/1984 | Hunter | 252/350 |
| 4,444,679 | 4/1984 | Rowland et al. | 252/350 |
| 4,495,107 | 1/1985 | Dodge et al. | 423/365 |
| 4,554,294 | 11/1985 | Hunter et al. | 252/350 |
| 4,655,962 | 4/1987 | Rowland et al. | 252/350 |
| 4,714,568 | 12/1987 | Hurnik et al. | 252/350 |

FOREIGN PATENT DOCUMENTS 371947 8/1930 Belgium .
1116633 6/1968 United Kingdom .

OTHER PUBLICATIONS

Bailer et al., "Comprehensive Inorganic Chemistry", vol. 1, p. 1247 and vol. 3, pp. 216–217, Pergamon Press (1973) Oxford QD151.2 C6.
Paulenko et al., Chem. Abs., 103, ab. #184436 (1985).
Baslar et al., Comprehension Inorganic Chemistry, vol. 1, p. 1247, Pergamon Press (1973) Oxford.

Primary Examiner—Edward A. Miller
Attorney, Agent, or Firm—Ostrolenk, Faber, Gerb & Soffen

[57] ABSTRACT

The use as an activator for a chemical blowing agent, or as an accelerator or activator in the vulcanization of rubber, of a reaction product of urea and an oxide, carbonate or hydroxide of zinc, cadmium, calcium or lead, which reaction product may be optionally solvated, and certain such products per se.

9 Claims, No Drawings

BLOWING AGENT COMPOSITION

This is a continuation of application Ser. No. 039,798 filed on Apr. 15, 1987 which was a continuation of application Ser. No. 626,093, filed June 29, 1984, both now abandoned.

This invention concerns compounds which activate chemical blowing agents or activate the action of rubber curing accelerators, compositions containing them, and methods of using them.

Chemical blowing agents, particularly azodicarbonamide, have been used for many years in the manufacture of foamed plastics materials, the properties of which depend largely on the decomposition characteristics of the blowing agent at the temperature employed. Consequently, it has become conventional to use so-called 'activators' for the blowing agent to modify the way in which it decomposes, the most common of such activators being zinc, cadmium and lead compounds. By judicious selection of these and the quantities employed, it has been possible to achieve a considerable range of characteristics and properties in the final foamed product. By far the most effective are mixtures of cadmium and zinc compounds. As will be appreciated however, cadmium and lead compounds are expensive and toxic, and a great need has existed for an effective activator which can eliminate or substantially reduce the use of such compounds.

In the curing or vulcanisation of rubber, elemental sulphur has generally been employed as the curing agent, with organic accelerators being used to accelerate the reaction in conjunction with zinc oxide to activate the accelerator. With the increasing cost of zinc oxide, the need has constantly existed for a new activator which is more efficient and cost-effective.

We have now found a group of compounds, some of which are novel, which have improved properties as activators for chemical blowing agents and as activators for rubber curing accelerators. The compounds may also be rubber curing accelerators themselves.

Accordingly, in one aspect, this invention provides the use as an activator for a chemical blowing agent, or as an accelerator or activator in the vulcanisation of rubber, of a reaction product of urea and an oxide, carbonate or hydroxide of zinc, cadmium, calcium or lead, which reaction product may be optionally solvated.

The chemical structure of such products appears to depend on the temperature employed in the reaction and the solvent, if any, employed and it is consequently difficult to ascribe a formula thereto. However, it appears that their analysed structure corresponds in general to the formula:

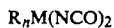

$$R_nM(NCO)_2 \quad (I)$$

where M represents zinc, cadmium, calcium or lead, R represents $NH_3$ or a solvent ligand, and n, which may be fractional, is from 0 to 4.

Where n is fractional, it is likely that a mixture of compounds is involved, in each of which n represents a whole number, though this is not certain.

In another aspect, the invention provides compounds whose elemental analysis corresponds to compounds of formula I wherein n is from 0.5 to 4, preferably 1.0 to 3.0, especially 1.5 to 2.5.

In a further aspect, the invention provides an activated blowing agent composition which comprises a thermally decomposable blowing agent, especially azodicarbonamide, a sulphonhydrazide or dinitrosopentamethylenetetramine, in association with a suitable amount of one or more optionally solvated reaction products of urea and an oxide, carbonate or hydroxide of zinc, cadmium, calcium or lead.

The ratio of the optionally solvated reaction product to the blowing agent is preferably from 1:20 to 1:1 by weight, especially from 1:10 to 1:2.

In yet another aspect, the invention provides a rubber curing composition which comprises sulphur and a suitable amount of one or more optionally solvated reaction products of urea and an oxide, carbonate or hydroxide of zinc, cadmium, calcium or lead.

The ratio of the optionally solvated reaction product to the sulphur is preferably from 1:5 to 5:1, especially from 1:2 to 2:1.

The reaction of the oxide, carbonate or hydroxide with urea is preferably carried out by heating the reactants together, optionally in the presence of a suitable solvent, to a temperature in the range of 120° to 180° C. Analysis of the products obtained at various temperatures appears to indicate that n in formula I decreases with increasing temperature, so that products having the desired value of n can be produced by controlling the reaction temperature appropriately.

From 2 to 5 moles of urea are preferably employed per mole of the metal oxide, carbonate or hydroxide.

Some solvents for the reaction, e.g. methanol, dimethylformamide and dimethylsulphoxide appear to be true solvents, and give the same reaction product as in the absence of any solvent, that is one where R represents $NH_3$. However, other solvents, particularly glycols such as ethylene glycol, propylene glycol, polyethylene glycol or polypropylene glycol, appear to solvate the product, replacing one or more of the $NH_3$ ligands by solvent ligands. Such solvated products are liquid and often of improved properties compared with the corresponding non-solvated compounds of formula I, and are intended to be encompassed by the term 'solvated' as used herein.

Zinc is very much preferred as the metal in the oxide, carbonate or hydroxide employed by virtue of its low toxicity and cost.

An especially preferred reaction product results when urea is reacted with zinc oxide, carbonate or hydroxide, especially zinc oxide, at a temperature of from 135° to 160° C. This product appears to be of formula I wherein R is $NH_3$ and n represents approximately 2. If the reaction is effected in a glycol solvent, particularly polyethylene glycol, or if the reaction product is dissolved in ethylene glycol and then heated, a particularly advantageous 'solvated' compound is produced in which the $NH_3$ ligands appear both to be displaced by glycol ligands.

The reaction products of the invention are highly efficient activators for blowing agents, particularly azodicarbonamide, giving greater expansion at equivalent rates, or equal expansion at lower rates, than conventional zinc/cadmium compound activators. Consequently, reduced rates may normally be employed. Where the metal in the reaction product is zinc, the toxicity problems and expense of conventional cadmium compounds may be avoided.

When used in the so-called inhibition method of chemical embossing, the compounds of the present invention may be inhibited by acids, e.g. safe unsatu-

3 rated fatty acids, for example linolenic acid, which may consequently be employed as the inhibitor in place of the toxic and difficult to handle tri-mellitic anhydride which is used in conventional zinc oxide activation.

The reaction products of the invention are also highly efficient activators for rubber curing accelerators, giving greater activation at equivalent rates, or equal activation at lower rates, than zinc oxide.

The following examples are given, though only by way of illustration.

EXAMPLE 1

Urea (300 g) and zinc oxide (100 g) were heated together in an open beaker. Reaction started at 120° C., but the temperature then increased to 125°–128° C. and became steady. Ammonia was evolved. After 30 minutes, the reaction slowed and the solution became clear. The temperature was then increased to 140° C. for 15–20 minutes. A white solid formed which was washed when cold with methanol to remove unreacted urea and by-products. 220 g of product were obtained.

Analysis: Found: $NH_3$ 19.4%, Zn 34.9%, NCO 42.0%. $(NH_3)_2Zn(NCO)_2$ requires: $NH_3$ 18.6%, Zn 35.5%, NCO 45.9%.

EXAMPLE 2

Urea (300 g) and zinc oxide (100 g) were added to polyethylene glycol (400 g), and the mixture was heated. Evolution of ammonia commenced at 125° C. and the temperature increased to 130°–135° C. After 1 hour the solution became clear, and the temperature was then increased to 140°–145° C. to eliminate ammonia. On cooling a pale yellow, viscous solution was obtained, the analysis of which corresponded to formula I wherein n=2 and R is polyethylene glycol.

EXAMPLE 3

A 40% solution of the product of Example 1 in ethylene glycol was comparatively tested against two conventionally used cadmium/zinc soap activator solutions, Akzo Chemie M-3450 and Diamond Shamrock LC90.

Each activator was incorporated into a polyvinyl chloride formulation containing polyvinyl chloride (100 parts by weight), dioctyl phthalate (75 parts), calcium carbonate filler (25 parts), and Genitron AC4 50% dispersion 5 parts (azodicarbonamide blowing agent) at rates of 1 and 2 parts by weight.

The formulations were coated onto release paper and passed down a Spooner hot air oven at temperatures of from 160° C. to 200° C. After expansion, the foams produced were measured. It was found that in each case the zinc compound of the present invention had caused 50% greater expansion of the foam than the proprietary cadmium/zinc solutions at the same rates, and that the 1 part rate of the present zinc compound caused approximately the same expansion as the 2 part rate of the proprietary activators.

EXAMPLE 4

Urea (320 g) and cadmium oxide (100 g) were heated together in an open beaker. Evolution of ammonia occurred at 122° C., and the temperature was gradually increased to 160° C. over a period of 50 minutes. The red colouration of the cadmium oxide disappeared, and a white solid was formed which contained 24% by weight cadmium and melted at 105° C.

EXAMPLE 5

The compound produced in Example 4 above was ground by an air microniser and was mixed with azodicarbonamide in a weight ratio of 30 parts of the former to 70 parts of the latter. The mixture was heated and found to decompose at 105° C. with the evolution of gas compared with a decomposition temperature of 170° C. with cadmium oxide alone as the activator.

EXAMPLE 6

Zinc carbonate (100 g) and urea (250 g) were heated together in an open beaker, following the method of Example 1. The white solid formed was found to be virtually identical to the product of Example 1.

EXAMPLE 7

Litharge (100 g) and urea (300 g) were heated together in an open beaker following the method of Example 1. Reaction started at 125° C. and continued for 30 minutes, with a maximum temperature of 155° C. The yellow colouration of the lead oxide gradually disappeared to give a white opaque liquid, which on cooling gave a white solid, mp 102° C., in a yield of 84%.

EXAMPLE 8

In a formulation comprising, by weight:
Styrene butadiene rubber—17%
Inorganic fillers (mainly calcium carbonate)—7%
Plasticizers—17.5%
Azodicarbonamide—3%
Zinc Oxide—1.5%
Sulphur—1%
Di-2-benzothiazyl disulphide—0.1%
Zinc mercaptobenzothiazyl—0.1%
it was found to be possible to replace the zinc oxide with 1.25% of the zinc compound of Example 1 (representing over a 60% reduction in the quantity of zinc required) without affecting the rate of the vulcanisation. In addition, there was good activation of the azodicarbonamide giving a high quality rubber foam.

I claim:

1. The non-gaseous reaction product formed by reacting from 2 to 5 molar proportions of urea with one molar proportion of an oxide, carbonate or hydroxide of zinc at a temperature of from 120° C. to 180° C., said reaction product being a composition having an analysis which corresponds to the formula $(NH_3)_nZn(NCO)_2$ where n, which may be fractional, is from 0.5 to 4.

2. The non-gaseous reaction product according to claim 1 produced at a temperature of from 135° C. to 160° C.

3. The non-gaseous composition according to claim 1 wherein n is from 1.5 to 2.5.

4. An activated chemical blowing agent composition which comprises a thermally decomposable blowing agent selected from the group consisting of azodicarbonamide, sulphonhydrazide and dinitrosopentamethylenetetraamine in combination with the reaction product of claim 1.

5. An activated chemical blowing agent composition according to claim 4 in which the thermally decomposable blowing agent is azodicarbonamide.

6. An activated chemical blowing composition according to claim 4 in which n is 1.5 to 2.5.

7. In a method of foaming, comprising heating a non-gaseous foaming agent-containing composition to generate foam, the improvement wherein the foaming agent is the reaction product of urea and an oxide, carbonate or hydroxide of zinc at a temperature of from 120° C. to 180° C., said reaction product having an analysis which corresponds to the formula $(NH_3)_n Zn(NCO)_2$ where n, which may be fractional, is from 0.5 to 4.

8. The method according to claim 7 in which the reaction product is formed by reacting 2 to 5 molar proportions of urea with one molar proportion of the oxide, carbonate or hydroxide of zinc at a temperature of 135° to 160° C.

9. The method of claim 8 in which n is from 1.5 to 2.5.

* * * * *